(12) United States Patent
Lewis et al.

(10) Patent No.: US 7,995,697 B2
(45) Date of Patent: Aug. 9, 2011

(54) POLAR MODULATION / ONE-POINT FREQUENCY MODULATION WITH FLEXIBLE REFERENCE FREQUENCY

(75) Inventors: Michael Lewis, Märsta (SE); Detlev Theil, Bromma (SE)

(73) Assignee: Infineon Technologies AG, Neubiberg (DE)

(*) Notice: Subject to any disclaimer, the term of this patent is extended or adjusted under 35 U.S.C. 154(b) by 1077 days.

(21) Appl. No.: 11/764,648

(22) Filed: Jun. 18, 2007

(65) Prior Publication Data
US 2008/0310573 A1    Dec. 18, 2008

(51) Int. Cl.
    *H03D 3/24*    (2006.01)
(52) U.S. Cl. ...................... 375/376; 332/127
(58) Field of Classification Search ............... 375/327, 375/374–376; 332/127
    See application file for complete search history.

(56) References Cited

U.S. PATENT DOCUMENTS

| | | | | |
|---|---|---|---|---|
| 6,049,255 A | * | 4/2000 | Hagberg et al. | 331/17 |
| 6,670,861 B1 | * | 12/2003 | Balboni | 332/103 |
| 2005/0141638 A1 | * | 6/2005 | Haiut | 375/296 |
| 2005/0156676 A1 | * | 7/2005 | Wang et al. | 331/16 |

* cited by examiner

*Primary Examiner* — Chieh M. Fan
*Assistant Examiner* — Freshteh N Aghdam
(74) *Attorney, Agent, or Firm* — Lee & Hayes, PLLC (57) ABSTRACT

Apparatuses and methods for operating a modulation system using a flexible reference frequency signal are disclosed. A modulation system uses a phase-locked loop (PLL). An internal reference signal source is configured to provide an internal reference signal having an internal frequency that is substantially independent of the reference frequency. A frequency signal source is configured to provide a plurality of first samples of the frequency signal taken at a first sampling frequency according to the internal reference signal. A resampling device is configured to receive and resample the plurality of first samples to generate a plurality of second samples taken at a second sampling frequency according to the reference frequency. A loop gain compensation device is configured to receive the reference frequency and apply an offset gain to inversely offset a change in PLL loop gain responsive to a change in the reference frequency.

34 Claims, 6 Drawing Sheets

FIGURE 1
(BACKGROUND)

FIGURE 2
(BACKGROUND)

POLAR MODULATION / ONE-POINT FREQUENCY MODULATION WITH FLEXIBLE REFERENCE FREQUENCY

BACKGROUND

Polar modulation and one-point frequency modulation systems offer advantages over other modulation systems. For example, both make use of digital devices for signal processing instead of analog devices and both operate using only a single carrier frequency. As a result, polar modulation and one-point frequency modulation employ less complex designs and consume less power than alternative systems. Both polar modulation and one-point frequency modulation are well-suited for use in mobile telephones, networkable portable computers and entertainment devices, and other portable communications devices.

Both polar modulation and one-point frequency modulation systems are dependent upon the reference clock frequency signal supplied to them. Thus, each of these systems has to be adapted to operate with the reference frequency of the device in which it is used. Unfortunately, this means that many different modulation systems have to be created for use in many different devices.

Polar modulation and one-point frequency modulation systems also are used for secondary communications systems included in telephones and computing devices, such as Bluetooth communication systems or wireless local area network adapters. These secondary systems also have to be adapted to the different reference frequencies of the systems in which they will be used. Having to design and manufacture many different modulation systems for different reference frequencies makes it difficult to exploit economies of scale, thus, making it more expensive to produce polar modulation and one-point frequency modulation systems.

BRIEF DESCRIPTION OF THE DRAWINGS

Non-limiting and non-exhaustive embodiments of the present disclosure are described with reference to the following drawings FIG. 1 (background) is a block diagram of a conventional polar modulator.

In the drawings, like numerals represent like elements. In addition, the first digit in each of the three-digit reference numerals refers to the figure in which the referenced element first appears.

DETAILED DESCRIPTION

Various embodiments of the present disclosure will be described in detail with reference to the drawings, where like reference numerals represent like parts and assemblies throughout the several views. Reference to various embodiments does not limit the scope of the disclosure, which is limited only by the scope of the claims attached hereto. Additionally, examples set forth in this specification are not intended to be limiting and merely set forth some of the many possible embodiments contemplated in the present disclosure.

Briefly stated, the present disclosure is related to apparatuses and methods for operating a modulation system using a flexible reference frequency. The modulation system uses a phase-locked loop. An internal reference signal source is configured to provide an internal reference signal having an internal frequency that is substantially independent of the reference frequency. A frequency signal source is configured to provide a plurality of first samples of the frequency signal wherein the first samples are taken at a first sampling frequency according to the internal reference signal. A resampling device is configured to receive and resample the plurality of first samples to generate a plurality of second samples taken at a second sampling frequency according to the reference frequency. A loop gain compensation device is configured to receive the reference frequency and apply an offset gain to inversely offset a change in PLL loop gain responsive to a change in the reference frequency.

Operation of Polar and One-Point Frequency Modulation Systems

Figure 1:
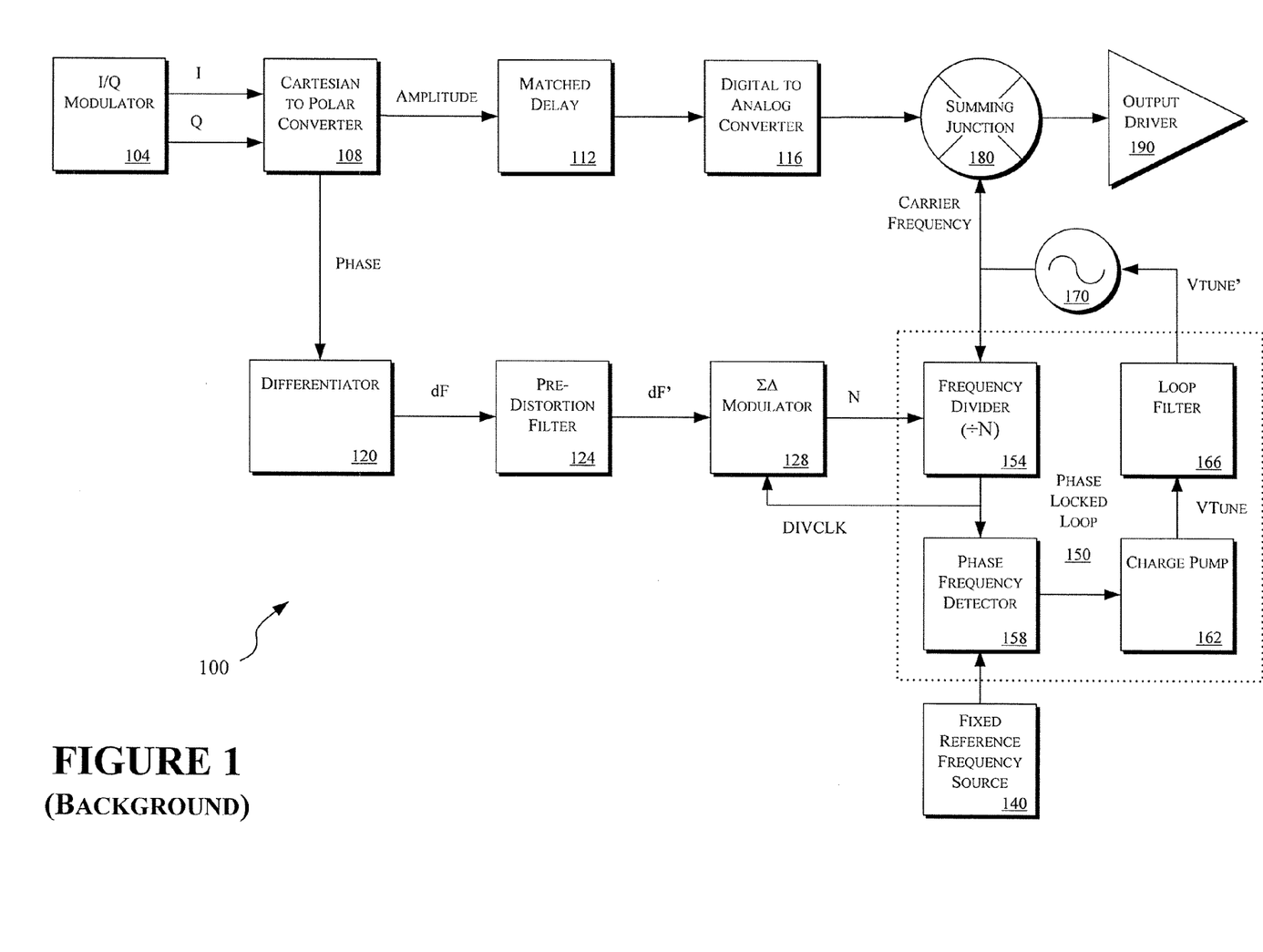
Figure 2:
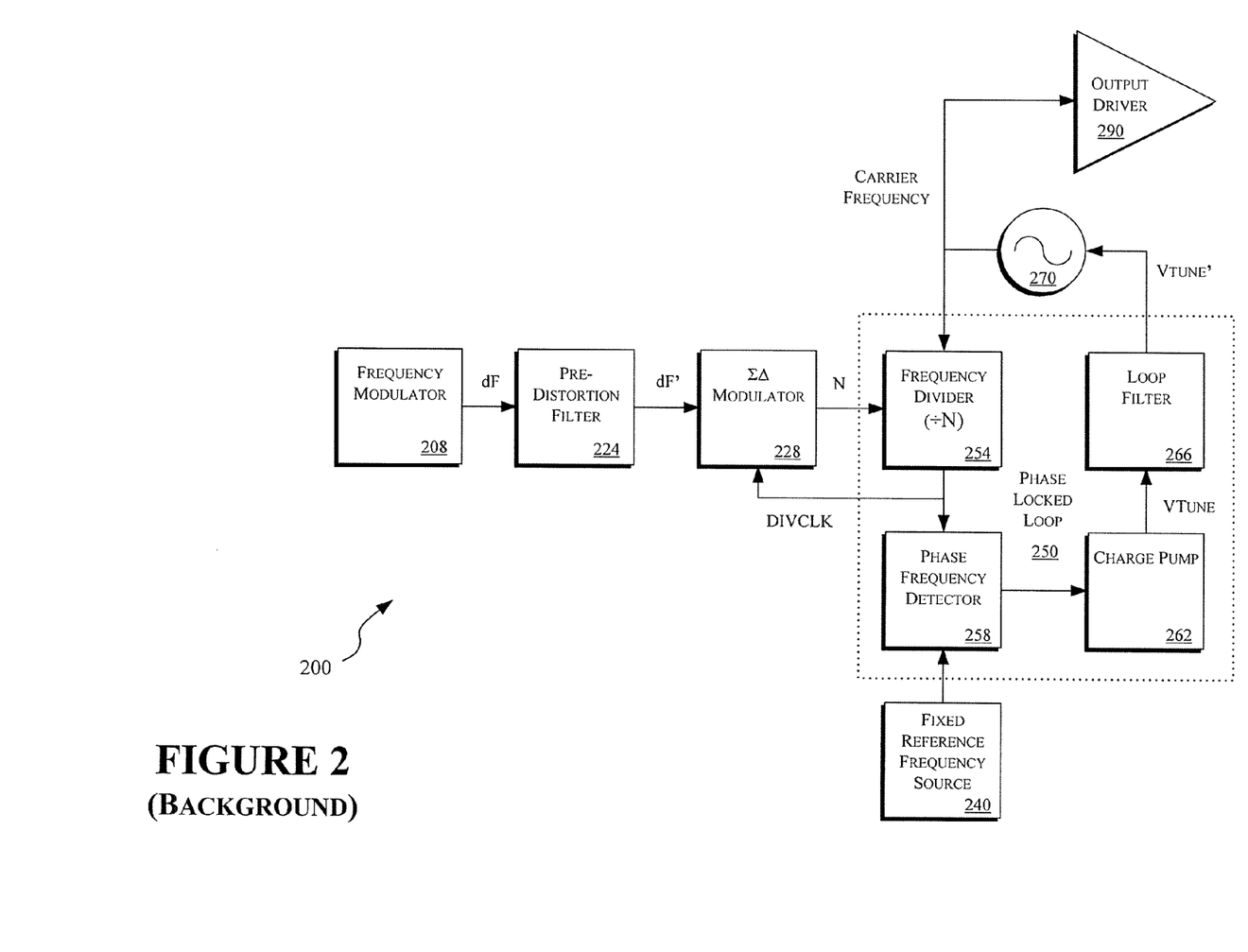
FIG. 2 (background) is a block diagram of a conventional one-point frequency modulator.

FIGS. 1 and 2 are block diagrams of basic polar and one-point frequency modulators, respectively. The polar modulation system 100 and the one-point frequency modulation system 200 both are configured to operate using a pre-established reference frequency. The following explanations of the polar modulation system 100 and the one-point frequency modulation system 200 are provided to illustrate how implementations of modulation systems with flexible reference frequencies described below adapt to a provided reference frequency and still operate as intended.

The polar modulation system 100 of FIG. 1 is configured to use a fixed reference frequency. The polar modulation system 100 includes an I/Q modulator 104 and a Cartesian-to-polar converter 108. In an amplitude path, the polar modulation system 100 also includes a matched delay 112 and a digital-to-analog converter (DAC) 118. In a phase path, the polar modulation system 100 includes a differentiator 120, a pre-distortion filter 124, a sigma-delta (ΣΔ) modulator 128, a phase locked loop (PLL) 150, and a voltage controlled oscillator (VCO) 170. The PLL 150 includes a frequency divider 154, a phase frequency detector 158, a charge pump 12, and a loop filter 166. The PLL 150 also receives a reference frequency signal from a fixed reference frequency source 140. The outputs of the amplitude path and the phase path are received and combined at a summing junction 180. The combined signal generated by the summing junction 180 is presented to an output driver 190 that produces the output signal.

The I/Q modulator 104 receives a series of digital data bits (not shown). The I/Q modulator 104 maps the data bits into Cartesian I and Q signals. In a conventional non-polar modulator, the I and Q signals would be combined with separate I and Q carrier signals, summed, and provided to an output driver. However, in the polar modulation system 100, the I and Q signals are presented to a Cartesian-to-polar converter 108 that converts the I and Q signals into amplitude and phase components.

The amplitude component is presented to the matched delay 112 to interpose a delay in the amplitude path to correspond with the processing delays occurring in the phase or frequency path. The output of the matched delay 112 is presented to the DAC 116. The output of the DAC 116 is presented to the summing junction 180.

The phase component is presented to the differentiator 120. Frequency represents the change in phase over time, and the derivative of phase is frequency. Thus, the output of the differentiator 120 is a frequency signal dF representing frequency deviations. Because the PLL 150 operates at a lower frequency than the frequency of the signal it modulates, the PLL 150 has an inherent, low-pass frequency response that can attenuate higher frequency signal samples. The output of the differentiator 120 is presented to the pre-distortion filter 124 to compensate for the low-pass frequency response of the PLL 150. The pre-distortion filter 124 boosts the higher frequency samples to produce a modified frequency signal dF' to prevent the attenuation of the high frequency samples. The modified frequency signal dF' generated by the pre-distortion filter 124 is presented to the sigma-delta (ΣΔ) modulator 128. The sigma-delta modulator that is used to adapt the dynamics of the PLL 150 to the reference frequency provided by the fixed reference frequency source 140, as explained below.

The PLL 150 controls the frequency generated by the VCO 170 in a closed-loop arrangement. The output of the VCO 170 is received by the frequency divider 154 of the PLL 150. The frequency divider 154 divides the frequency generated by the VCO 170 by a value N produced by the sigma-delta modulator 128. The output of the frequency divider 154 is a divided clock signal, DIVCLK. The phase frequency detector 158 receives both the reference frequency signal from the fixed reference frequency source 140 and the divided clock signal DIVCLK. The phase frequency detector 158 determines whether the divided frequency signal DIVCLK, which is representative of the output frequency of the VCO 170, either leads or lags relative to the reference frequency signal. If the frequency output of the VCO 170 lags behind the reference frequency signal, the phase frequency detector 158 directs the charge pump 162 to increase a tuning voltage, VTune. The tuning voltage VTune is passed through the loop filter 166 to reduce ripple resulting from the pulsed operation of the charge pump 162 to produce a smoothed, modified tuning voltage, VTune'. In the closed-loop PLL configuration, the output of the loop filter 166 controls the operating frequency of the VCO 170 such that it is equal to the reference frequency multiplied by the (time-averaged) division ratio N.

The operating frequency of the VCO 170 is proportional to the modified tuning voltage VTune' presented by the loop filter 166 from the tuning voltage VTune produced by the charge pump 162. (For the sake of simplicity, the collective signal presented by the charge pump 162 and the loop filter 166 will be termed the tuning voltage). An increase in the reference frequency increases the effective gain through the phase-frequency detector 158 and charge pump 162. Because the PLL 150 in the polar modulation system 100 is implemented in a closed-loop arrangement with the VCO 170, the increase in the reference frequency does not change the operating frequency of the VCO 170 as long as a corresponding change is made in the division ratio N, but the increased gain through the charge pump has the effect of modifying the dynamic behavior of the PLL control loop.

The sigma delta modulator 128 receives the divided clock signal DIVCLK generated by the frequency divider 154 and the modified frequency signal dF' generated by the pre-distortion filter 124. The sigma-delta modulator 128, which is clocked by the divided clock signal DIVCLK, manipulates the division ratio N used by the frequency divider 154. The sigma-delta modulator 128 manipulates the division ratio N on a cycle-by-cycle basis of DIVCLK to generate an average division ratio. The average division ratio causes the PLL 150 to direct the VCO 170 to generate a carrier frequency as a function of the modified frequency signal dF', such that the carrier signal has the correct phase corresponding to the phase generated by the Cartesian-to-polar converter 108. Thus, the summing junction 180 applies a signal to the output driver that represents both the amplitude and phase components generated by the Cartesian-to-polar converter 108.

FIG. 2 is a block diagram of a conventional one-point frequency modulation system 200 configured to use a fixed reference frequency. Many of its components are identical to those of the polar modulation system 100 (FIG. 1). The one-point frequency modulation system 200 of FIG. 2 is configured to use a fixed reference frequency. The one-point frequency modulation system 200 includes a frequency modulator 208, a pre-distortion filter 224, a sigma-delta (ΣΔ) modulator 228, a phase locked loop (PLL) 250, and a voltage controlled oscillator (VCO) 270. The PLL 250 includes a frequency divider 254, a phase frequency detector 258, a charge pump 262, and a loop filter 266. The PLL 150 also receives a reference frequency signal from a fixed reference frequency source 240. The output of the VCO 270 is presented to an output driver 290 that produces the output signal.

Input data bits (not shown) are received by a frequency modulator 204 that converts series of bits into samples of a representative frequency signal dF. Because the PLL 250 operates at a lower frequency than the frequency of the signal it modulates, the PLL 250 has an inherent, low-pass frequency response that can attenuate higher frequency signal samples. The output of the frequency modulator 208 is presented to the pre-distortion filter 224 to compensate for the low-pass frequency response of the PLL 250. The pre-distortion filter 224 boosts the higher frequency samples to produce a modified frequency signal dF' to prevent the attenuation of the high frequency samples. The modified frequency signal dF' generated by the pre-distortion filter 224 is presented to the sigma-delta modulator 228. The sigma-delta modulator that is used to adapt the dynamics of the PLL2150 to the reference frequency provided by the fixed reference frequency source 140.

As in the case of the polar modulation system 100 (FIG. 1), the PLL 250 and the VCO 270 are implemented in a closed-loop arrangement. The output of the VCO 270 is received by the frequency divider 254 of the PLL 250. The frequency divider 254 divides the frequency generated by the VCO 270 by a value N produced by the sigma-delta modulator 228. The output of the frequency divider 254 is a divided clock signal, DIVCLK. The phase frequency detector 258 receives both the reference frequency signal from the fixed reference frequency source 240 and the divided clock signal DIVCLK. The phase frequency detector 258 determines whether the divided frequency signal DIVCLK, which is representative of the output frequency of the VCO 270, either leads or lags relative to the reference frequency signal. If the frequency output of the VCO 270 lags behind the reference frequency signal, the phase frequency detector 258 directs the charge pump 262 to increase a tuning voltage, VTune. The tuning voltage VTune is passed through the loop filter 266 to reduce ripple resulting from the pulsed operation of the charge pump 262 to produce a smoothed, modified tuning voltage, VTune'. In the closed-loop PLL configuration, the output of the loop filter 266 controls the operating frequency of the VCO 270 such that it is equal to the reference frequency multiplied by the (time averaged) division ratio N.

The operating frequency of the VCO 270 is proportional to the modified tuning voltage VTune' presented by the loop filter 266 from the tuning voltage VTune produced by the charge pump 262. (For the sake of simplicity, the collective signal presented by the charge pump 162 and the loop filter 166 will be termed the tuning voltage). An increase in the reference frequency increases the effective gain through the phase-frequency detector and charge pump. However, because the PLL 250 is implemented in a closed loop arrangement with the VCO 270, the increase in the reference frequency does not change the operating frequency of the VCO 270 as long as a corresponding change is made in the division ratio N, but the increased gain through the charge pump has the effect of modifying the dynamic behavior of the PLL control loop.

The sigma delta modulator 228 receives the divided clock signal DIVCLK generated by the frequency divider 254 and the modified frequency signal dF' generated by the pre-distortion filter 124. The sigma-delta modulator 228, which is clocked by the divided clock signal DIVCLK, manipulates the division ratio N used by the frequency divider 254. The sigma-delta modulator 228 manipulates the division ratio N on a cycle-by-cycle basis of DIVCLK to generate an average division ratio. The average division ratio causes the PLL 250 to direct the VCO 270 to generate a carrier frequency as a function of the modified frequency signal dF'.

The foregoing explanations of polar and one-point frequency modulation systems 100 and 200, respectively, are provided to illustrate their dependency on the reference frequency. Changing the reference frequency changes the clock signal to the digital components in both systems. For example, digital modulation devices such as the Cartesian-to-polar converter 108 and the frequency modulator 208 need to operate at a designated character or signal rate to function properly. If the clock signal is too slow or too fast, the digital modulator will not properly process the signal. Other digital devices, such as the DAC 116, simply may not function at arbitrary clock speeds In addition, changing the reference frequency changes the low-pass frequency response of the PLLs 150 and 250, so other components such as the pre-distortion filters 124 and 224 have to be modified to compensate for the changing frequency response.

Modulation Systems with Flexible Reference Frequencies

Figure 3:
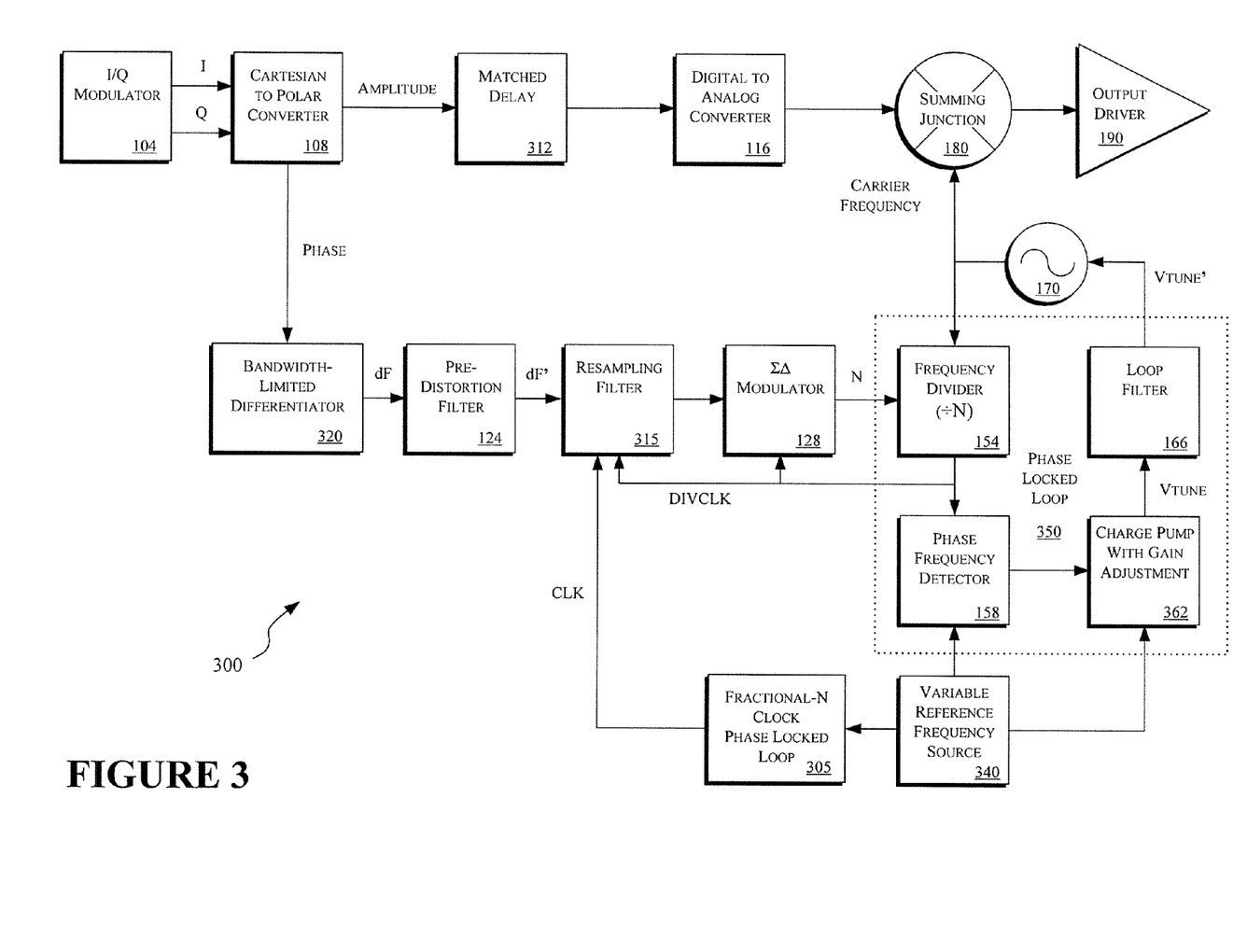
FIG. 3 is a block diagram of an implementation of a polar modulator allowing for a flexible reference clock frequency.
Figure 4:
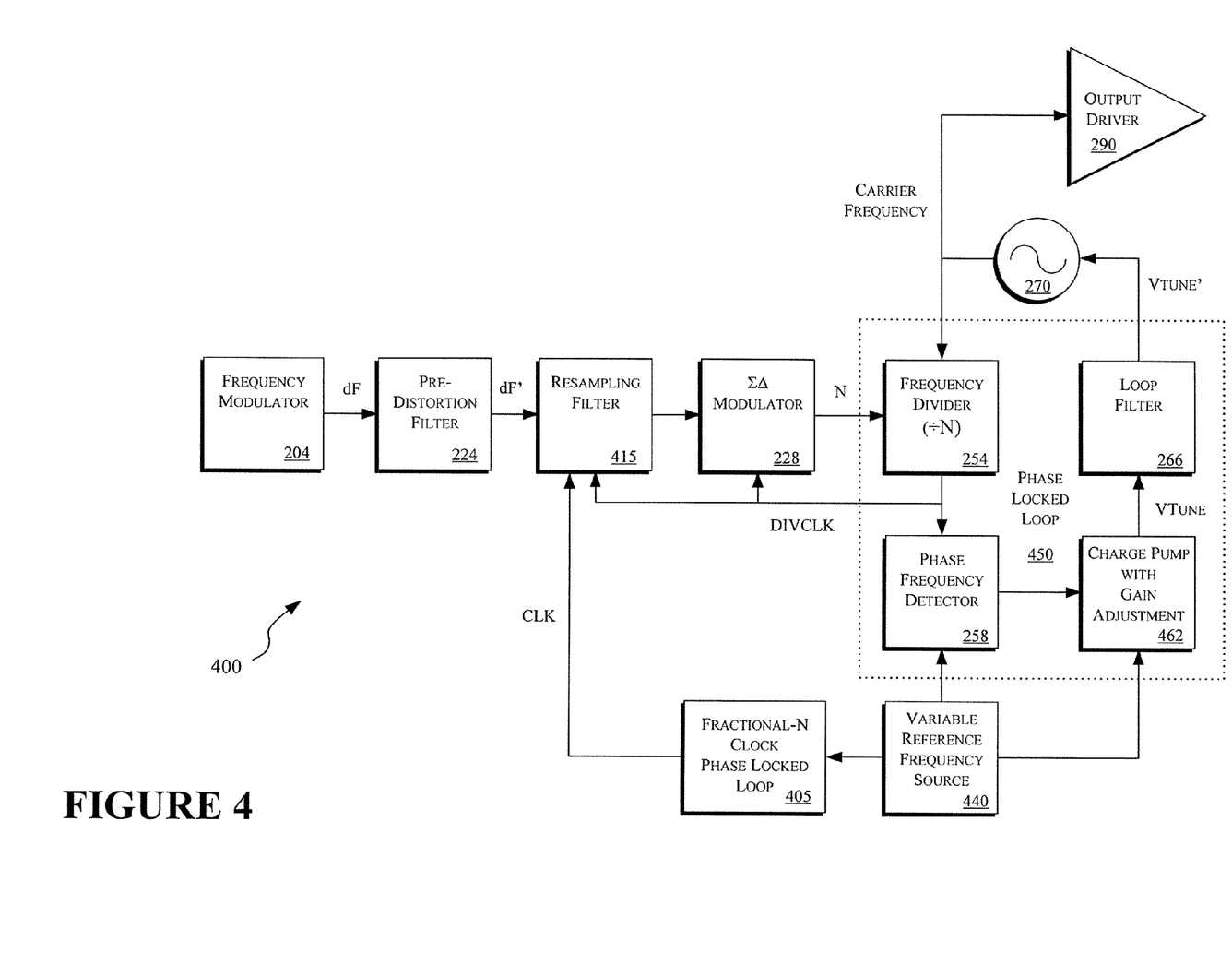
FIG. 4 is a block diagram of a one-point frequency modulator allowing for a flexible reference clock frequency.

FIGS. 3 and 4 are block diagrams of implementations of a polar modulation system 300 and a one-point frequency modulation system 400, respectively, allowing for a flexible reference clock frequency. Implementations of these modulation systems can function properly in systems using a variety of reference frequencies. As a result, one form of each type of modulation system can be designed and produced for devices using a range of reference frequencies. In other words, different models of each modulation system need not be specifically created for each different system that uses a different reference frequency.

In the following description, components of each of the modulation systems 300 and 400 that are the same as the components of the previously described fixed frequency systems 100 and 200, respectively, are identified with the same reference numerals, and their functions will not be explained again in detail. New reference numerals indicate new or modified components.

FIG. 3 is a block diagram of a polar modulation system with a flexible reference frequency 300. The flexibility in the reference frequency is represented by a variable reference frequency source 340. It should be noted that the variable reference frequency source 340 does not indicate that the reference frequency will vary within an individual device (although implementations of a polar modulation system with flexible reference frequency 300 could account for such variation). Instead, the designation variable reference frequency source 340 indicates that the polar modulation system 300 can operate in different devices that each use different reference frequencies.

In addition to replacing the fixed reference frequency source 140 with the flexible reference frequency source 340, there are five differences between the polar modulation system 100 and the polar modulation system with flexible reference frequency 300. First, the PLL 350 of the polar modulation system 300 is adapted to include a charge pump with gain adjustment 362. As previously described with reference to FIG. 1, the charge pump 162 responds to signals from the phase frequency detector 158 that indicate if the frequency generated by the VCO 170 leads or lags compared to the reference frequency signal 140. The signals from the phase frequency detector 158 cause the charge pump 162 to either increase or decrease the current flow and the tuning voltage. The charge pump with gain adjustment 362 in the PLL 350 is responsive both to the phase frequency detector 158 and to changes in the reference frequency. Thus, the modulation system 300 is able to adapt to different reference frequencies while maintaining substantially the same dynamic behavior of the PLL control loop.

As previously described with reference to the polar modulation system 100 (FIG. 1), the operating frequency of the VCO 170 is proportional to the tuning voltage VTune. In an open-loop arrangement, an increase in the reference frequency causes the phase frequency detector 158 to direct the charge pump 162 to increase the tuning voltage. However, implementing the PLL 350 in a closed-loop arrangement prevents the frequency of the signal generated by the VCO 170 from varying because, in the closed-loop arrangement, the output frequency is dictated by the average division ratio. However, the change in the reference frequency modifies the dynamic behavior of the PLL 350, leading to a mismatch between the loop frequency response and that of the pre-distortion filter 124.

The charge pump with gain adjustment 362 accounts for an increase in reference frequency by applying a gain factor that is inversely proportional to a change in the reference clock frequency. As a result, although the phase frequency detector 158 may signal the charge pump with gain adjustment 362 to increase the current and tuning voltage to the VCO, the inversely proportional gain adjustment would offset the signal from the phase frequency detector 158. The phase frequency detector 158 would still cause the charge pump with gain adjustment 362 to make changes in the current and tuning voltage when there is a relative lead or lag in the frequency of the signal generated by the VCO 170. However, because of the gain adjustment, a categorical change in the reference frequency signal does not result in a corresponding categorical change in the signal generated by the VCO 170.

The charge pump with gain adjustment 362 is suitably implemented in a number of ways. In one implementation, the charge pump with gain adjustment 362 is implemented using a programmable current mirror to serve as a loop gain compensation device in the charge pump 362. Also, the gain adjustment could be implemented as a separate device (not shown) that intercepts and modifies the output of the phase frequency detector 158 as a function of the reference frequency. Regardless of the implementation, however, the charge pump with gain adjustment 362 inversely proportionally adjusts the gain in response to the reference frequency. For example, when the reference frequency is doubled over some hypothetical, anticipated reference frequency, the output of the charge pump 362 is halved. On the other hand, if the reference frequency is halved, the output of the charge pump 362 is doubled. As a result, the frequency output of the polar modulation system 300 is maintained despite a change in the reference frequency.

Second, to maintain a workable clock signal to the digital components, a fixed clock signal, CLK is implemented using a fractional-N clock PLL 305. The introduction of the fractional-N clock PLL 305 provides a clock signal CLK at the same frequency that the digital components were designed to expect, regardless of variations in the reference frequency. The clock signal CLK is provided to digital systems in the amplitude path, such as the DAC 116, as well as digital components in the phase or frequency path. Thus, despite changes in the reference frequency signal, the digital components will still receive a clock signal at an expected rate, allowing the digital components to continue to function as designed.

Third, the polar modulation system with flexible reference frequency 300 includes a resampling filter 315 that allows for signal samples generated in the domain of the internal reference signal CLK to be transformed into equivalent samples in the domain of the changed reference frequency. The resampling filter 315 receives the modified frequency signal dF' from the pre-distortion filter 124, which in the digital domain includes a plurality of samples representing the frequency signal. The resampling filter 315 also receives both the internal clock signal CLK and the divided clock signal DIVCLK, which is proportional to the reference frequency.

Accepted sampling theory provides that a signal can be accurately reproduced from a discrete-time, sampled representation of the signal when the sampling rate is greater than half of the maximum frequency of the signal being sampled. Correspondingly, samples of a signal sampled at one sampling rate can be converted to samples at a second sampling rate without loss of information as long as both the first and second sampling rates are both greater than half the maximum frequency of the signal being sampled. This condition is satisfied as described below.

The conversion of the signal from the domain of the internal reference signal CLK to the domain of the sigma-delta modulator 128 DIVCLK clock domain is performed by a resampling filter 315. A number of known resampling techniques may be used. For example, a Farrow filter allows for a continuously variable delay between an input signal and an output signal. The Farrow filter thus would allow for the input frequency samples dF' sampled at the internal reference signal CLK to be delayed or held for sampling at the DIVCLK frequency.

Fourth, as previously mentioned, to satisfy the sampling theory condition that the signal be sampled and resampled at a rate greater than half of the maximum frequency being sampled, the bandwidth of the frequency signal is limited. In one implementation, a bandwidth-limited differentiator 320 is used in the polar modulation system 300. The bandwidth-limited differentiator 320 limits the maximum frequency of the signal dF so that it will always be less than twice both the CLK and DIVCLK reference signals. Alternatively, although not shown, a low-pass filter could be inserted in the frequency path to ensure that the sampling theory condition is met.

Fifth, to allow for timing changes in the frequency path, the matched delay 312 may have to be adjusted to account for delays introduced in the frequency path by the resampling filter, the bandwidth limited differentiator, or the introduction of a low-pass filter.

With these changes, the polar modulation system 300 is adaptable to range of reference frequencies and, thus, can be incorporated into a range of devices without having to be redesigned or adapted to a different reference frequency.

FIG. 4 shows an implementation of a one-point frequency modulation system with flexible reference frequency 400 that can operate in environments presenting a range of reference frequencies. As compared with the one-point frequency modulation system 200 of FIG. 2, in addition to replacing the fixed reference frequency source 240 to a variable reference frequency source 440, there are four other modifications or additions. Each of the changes or modifications is comparable to changes in the polar modulation system with flexible reference frequency 300 (FIG. 3). Because the changes are explained at length with reference to FIG. 3, descriptions of the changes are not repeated here.

First, the PLL 450 is adapted to include a charge pump with gain adjustment 462. Second, to maintain the clock signal to the digital components, a fixed clock signal, CLK is implemented using a fractional-N clock PLL 405. Third, the one-point frequency modulation system with flexible reference frequency 400 includes a resampling filter 415 that allows for signal samples generated in the domain of the internal reference signal CLK to be transformed into equivalent samples in the domain of the changed reference frequency. Fourth, although not shown in FIG. 4, a low-pass filter may be applied to the frequency signal before it is resampled to ensure that the rules of sampling theory are observed, as previously explained with regard to the polar modulation system with flexible reference frequency (FIG. 3).

Modulating a Signal Subject to Different Reference Frequencies

Figure 5:
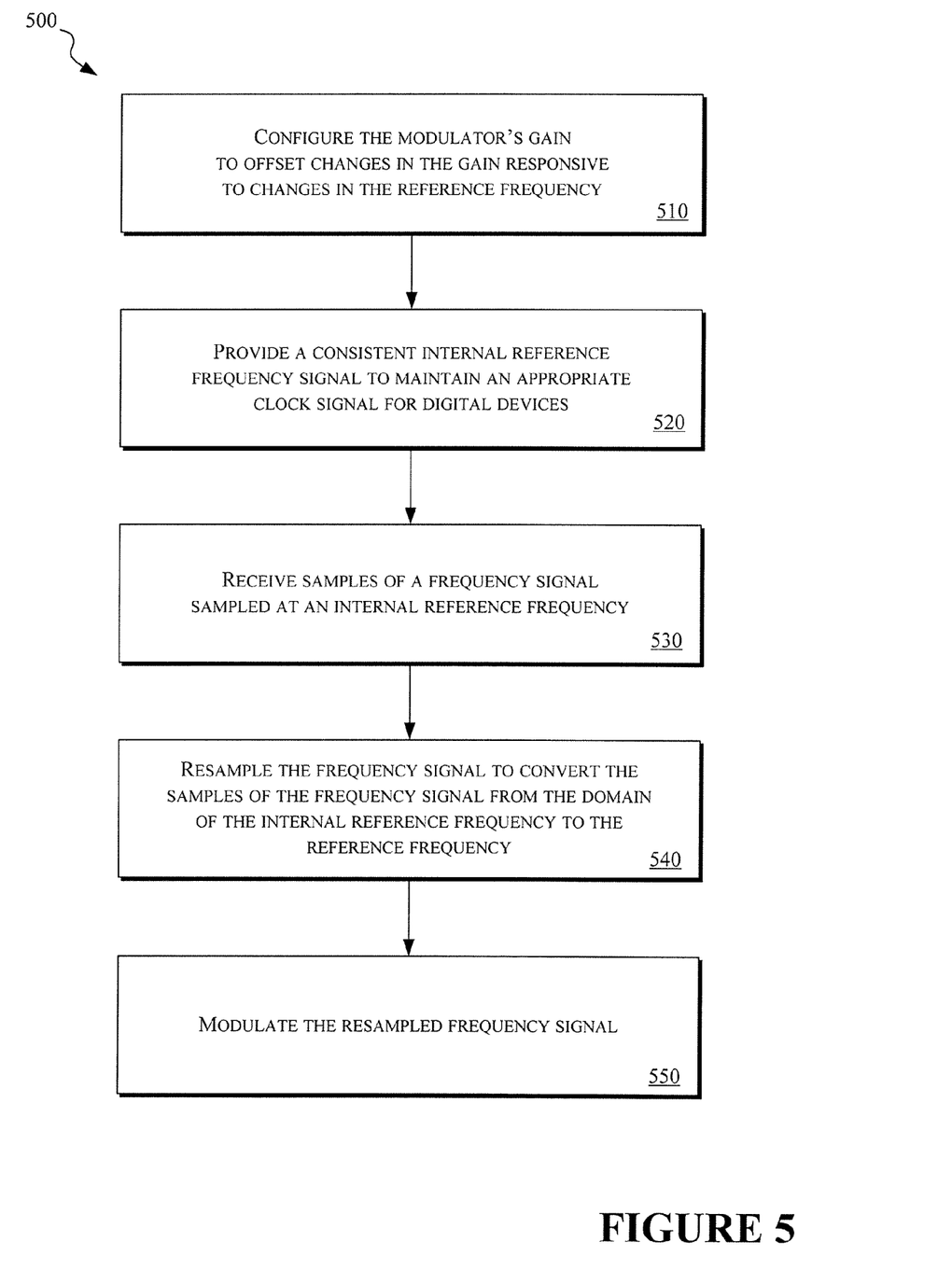
FIG. 5 is a flow diagram of an implementation of a modulation process operable to work with different reference frequencies.

FIG. 5 presents a flow diagram 500 of an implementation of a process for modulating a signal, such as a digital signal including samples of a frequency signal, allowing for the use of difference reference frequencies. At 510, a modulator's gain is configured to offset changes in the gain responsive to changes in the reference frequency. For example, as previously described with reference to FIGS. 1 and 2, the open-loop gain of a VCO/PLL closed-loop modulation system increases proportionally with changes in the reference frequency as a result of pulses generated by the current pump of the PLL. However, adapting the charge pump or the control of a charge pump in a PLL can be used to offset changes in the reference frequency, such that the dynamic behavior of the PLL will not change as different reference frequencies are input to the PLL.

At 520, a consistent internal reference frequency signal is provided to maintain an appropriate clock signal for the digital devices in the system. For example, as shown in FIGS. 3 and 4, a fractional-N clock phase locked loop may be used to supply an internal reference frequency signal CLK to the digital devices. By providing the devices with a consistent clock signal irrespective of the reference frequency, it can be ensured that the digital devices will operate as intended regardless of changes in the reference frequency.

At 530, samples of a frequency signal are received in which the frequency signal was sampled using the internal reference frequency. The frequency signal may include a frequency signal derived from a phase signal in a polar modulation system as described with reference to FIG. 3 or a frequency signal used by a one-point frequency modulation system as described with reference to FIG. 4. At 540, the frequency signal samples are resampled, transforming the samples taken at the internal reference frequency to a domain of the reference frequency or a fraction of the reference frequency.

At 550, the resulting resampled frequency signal is modulated. With reference to FIGS. 3-4, the resampled frequency signal is applied to a sigma-delta modulator 128 to control the operation of a PLL and VCO to generate an analog signal that is amplified by an output driver 190. In the case of polar modulation, the output of the VCO is applied to a summing junction along with a suitably converted and/or delayed amplitude component to generate a composite signal.

Adapting Polar Modulation and One-Point Frequency Modulation Systems

Figure 6:
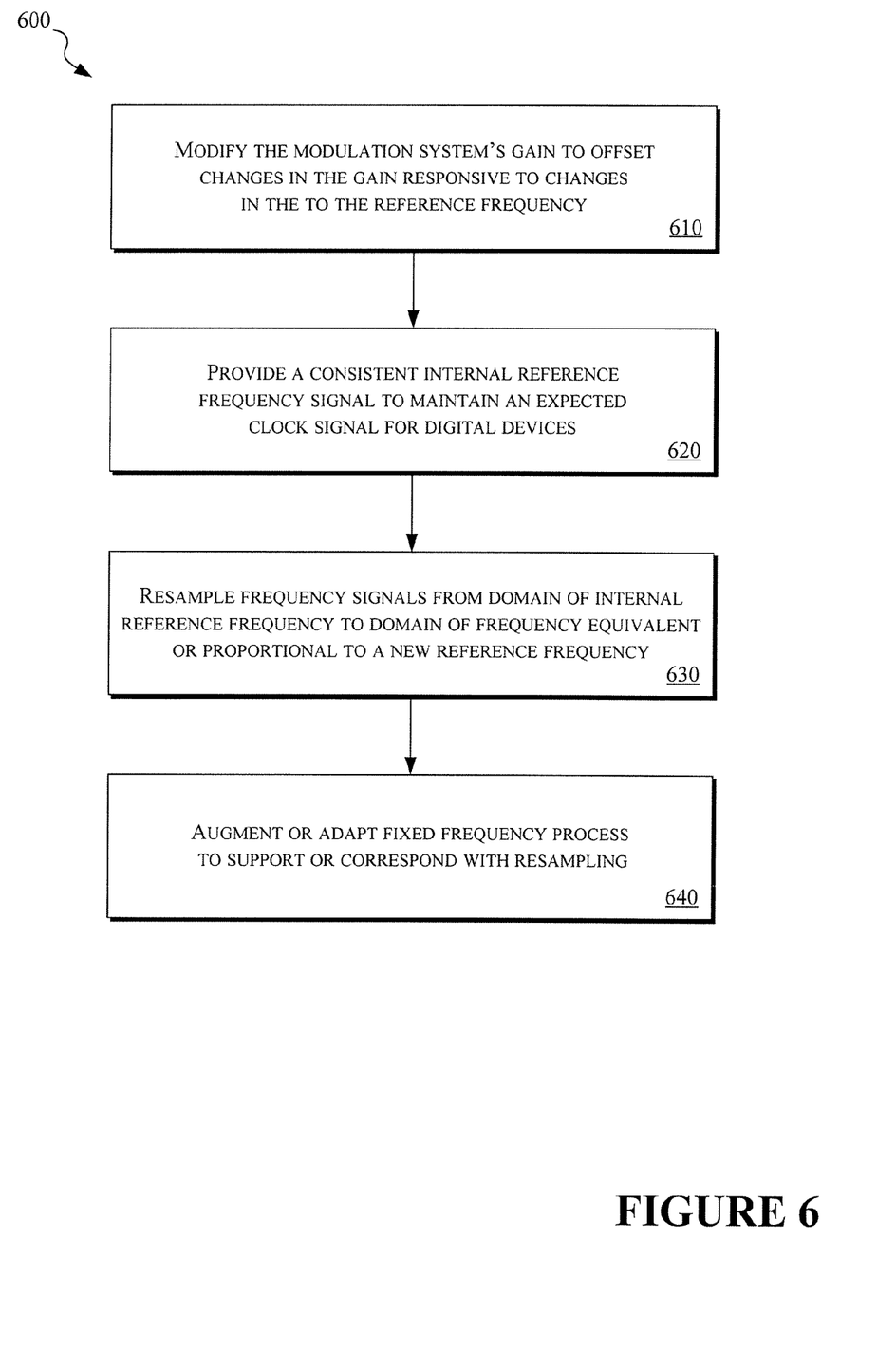
FIG. 6 is a flow diagram of an implementation of a process for adapting a polar or one-point frequency modulation system to accept various reference frequencies.

FIG. 6 presents a flow diagram 600 of an implementation of adapting a modulation system, such as a polar modulation frequency or one-point frequency modulation system to be used with varying reference frequencies.

At 610, the modulation system's gain is modified to offset changes in the gain responsive to changes in the reference frequency. According to one implementation previously described, changes in the open-loop gain of the PLL are offset by including a gain adjustment that effects an inversely proportional response in the output of the charge pump to counter changes in the gain changes in caused by changes in the reference frequency.

At 620, a consistent internal reference frequency signal is provided to maintain an expected clock signal for the digital devices. In one implementation previously described, the consistent internal reference signal is provided by using a fractional-N clock PLL that generates a clock signal assumed to be available in designing the digital devices used in the modulation system. However, any suitable process for providing a consistent internal reference signal may be used to maintain the operation of the digital devices used in the modulation system.

At 630, reference signals are resampled from a domain of the internal reference frequency to the domain of the frequency of the new reference frequency or a proportion of the new reference frequency. As previously described, signal theory allows for resampling of signals when each of the sampling frequencies is greater than half of the maximum frequency of the signal being sampled. A Farrow filter or other suitable device that allows for the recreating, delaying, or holding of the original signal as manifested in the original samples can be used to facilitate the resampling of the signal.

At 640, as warranted, commensurate changes are made to the system to support changes made to enable resampling of the signals. For example, in a polar modulation system, a delay in the amplitude path may be added or increased to correspond with delays in the frequency path relating to the resampling of the signal. Similarly, in one-point frequency modulation system or a polar modulation system, a low-pass filter or its equivalent (such as a bandwidth-limited differentiator in a polar modulation system) may be included in the frequency path to ensure that the signal being sampled is limited in frequency honor rules of sampling theory with reference to the sampling frequencies being used.

The above specification, examples and data provide a complete description of the manufacture and use of the composition of modulation with flexible reference frequency. Since many embodiments of modulation with flexible reference frequency can be made without departing from its spirit and scope, modulation with flexible reference frequency resides in the claims hereinafter appended.

The invention claimed is:

1. An apparatus for adapting a modulation system using a phase-locked loop (PLL) to operate using a reference frequency signal having a flexible frequency, comprising:
    an internal reference signal source configured to provide an internal reference signal having an internal frequency that is independent of the reference frequency;
    a frequency signal source configured to provide a plurality of first samples of a frequency signal wherein the first samples are taken at a first sampling frequency according to the internal reference signal;
    a pre-distortion filter configured to adapt the plurality of first samples to compensate for a low-pass frequency response of an output system;
    a resampling device configured to receive the internal reference signal, a divided frequency signal having a frequency proportional to frequency of the output system, and the plurality of adapted first samples and resample the plurality of first samples to generate a plurality of second samples taken at a second sampling frequency according to the reference frequency;
    a loop gain compensation device configured to receive the reference frequency and apply an offset gain to inversely offset a change in PLL open loop gain responsive to a change in the reference frequency; and
    a sigma-delta modulator configured to receive the plurality of second samples and the divided frequency signal and adapt a frequency division ratio used by the output system.

2. The apparatus of claim 1, wherein the frequency signal source includes a differentiator configured to provide the frequency signal as a derivative of a phase signal in a polar modulation system.

3. The apparatus of claim 2, further comprising a matched delay device included in an amplitude path configured to process an amplitude signal, wherein the matched delay is configured to apply a delay in processing the amplitude signal corresponding to a delay in the apparatus in processing the frequency signal.

4. The apparatus of claim 1, wherein the frequency signal source includes a differentiator configured to provide the frequency signal as a derivative of a phase signal in a polar modulation system.

5. The apparatus of claim 1, wherein the internal reference signal source includes a fractional-N clock phase locked loop configured to receive the reference frequency signal and generate the internal reference signal relative to the reference frequency signal.

6. The apparatus of claim 1, wherein the resampling device includes a Farrow filter configured to receive the plurality of the first set of samples and apply a variable delay to the first set of samples to allow for the plurality of second samples to be taken at the second sampling frequency.

7. The apparatus of claim 6, further comprising a bandwidth limitation device configured to limit the frequency signal to a maximum frequency such that the first sampling frequency and the second sampling frequency each are greater than half of the maximum frequency.

8. The apparatus of claim 1, wherein the output system for generating an output signal, the output system including a voltage controlled oscillator (VCO) configured in a closed loop arrangement with the PLL.

9. The apparatus of claim 1, wherein the loop gain compensation device includes a charge pump configured to vary a tuning signal generated by the charge pump that affects the output frequency of the VCO.

10. The apparatus of claim 9, wherein the charge pump includes a programmable current mirror configured to vary the tuning signal generated by the charge pump in response to the change in the reference frequency.

11. The apparatus of claim 8, wherein the PLL includes a frequency divider configured to receive the output frequency and generate a divided frequency signal at a divided frequency, wherein the second sampling frequency includes the divided frequency.

12. An apparatus for modulating an output signal, comprising:

a reference frequency signal source configured to provide a reference frequency signal;

an internal reference signal source configured to provide an internal reference signal having an internal frequency that is independent of the reference frequency;

a frequency signal source configured to provide a plurality of first samples of the frequency signal wherein the first samples are taken at a first sampling frequency according to the internal reference signal;

a pre-distortion filter configured to adapt the plurality of first samples to compensate for a low-pass frequency response of an output system;

a resampling device configured to receive the internal reference signal, a divided frequency signal having a frequency proportional to frequency of the output system, and the plurality of adapted first samples and resample the plurality of first samples to generate a plurality of second samples taken at the frequency of the divided frequency signal;

a sigma-delta modulator configured to receive the plurality of second samples and the divided frequency signal and adapt a frequency division ratio used by the output system; and the output system, including:

a voltage controlled oscillator (VCO) configured to receive a tuning signal and generate an output signal at an output frequency; and a phase-locked loop (PLL) configured in a closed-loop arrangement with the VCO to receive the reference frequency signal and the frequency division.

13. The apparatus of claim 12, wherein the frequency signal source includes a differentiator configured to:

provide the frequency signal as a derivative of a phase signal in a polar modulation system to one or more devices in a frequency path; and provide an amplitude signal to one or more devices in an amplitude path.

14. The apparatus of claim 13, further comprising a matched delay device included in an amplitude path configured to process the amplitude signal of the polar modulation system, wherein the matched delay is configured to apply a delay in the amplitude path corresponding to a delay in processing the frequency signal in the frequency path.

15. The apparatus of claim 14, further comprising a summing junction configured to:

receive the output frequency and an output of the amplitude path;

combine the output frequency and the output of the amplitude path; and provide a combined output signal representing both the output frequency and the output of the amplitude path.

16. The apparatus of claim 12, wherein the frequency signal source includes a frequency modulator configured to provide the frequency signal in a one-point frequency modulation system.

17. The apparatus of claim 12, wherein the internal reference signal source includes a fractional-N clock phase locked loop configured to receive the reference frequency signal and generate the internal reference signal relative to the reference frequency signal.

18. The apparatus of claim 13, wherein the resampling device includes a Farrow filter configured to receive the plurality of the first set of samples and apply a variable delay to the first set of samples to allow for the plurality of second samples to be taken at the second sampling frequency.

19. The apparatus of claim 13, wherein the loop gain compensation device includes a programmable current mirror configured to vary the tuning signal generated by the charge pump in response to the change in the reference frequency.

20. A method for modulating an output signal in response to receiving a reference frequency signal having a variable frequency, comprising:

adjusting a modulator gain to offset a change in the modulator gain responsive to a change in the reference frequency;

providing an internal reference frequency to maintain an appropriate clock signal for digital devices despite the change in the reference frequency;

receiving samples of a frequency signal sampled at the internal reference frequency;

adapting the samples to compensate for a low-pass frequency response of an output system;

resampling the frequency signal to convert the samples from a domain of the internal reference frequency to a domain according to the reference frequency; and providing the resampled frequency signal to a sigma-delta modulator configured to receive a plurality of second samples and the divided frequency signal and adapt a frequency division ratio used by the output system, wherein the resampled frequency signal is generated responsive to the internal reference signal, a divided frequency signal having a frequency proportional to the output frequency.

21. The method of claim 20, wherein the samples of the frequency signal are received one of:

as a frequency component derived from a phase component generated by a polar modulation system; and as a frequency modulator output in a one-point frequency modulation system.

22. The method of claim 21, further comprising adjusting the resampled frequency signal to compensate for changes in a low-pass frequency response of the output system.

23. The method of claim 20, wherein resampling the frequency signal to convert the samples from a domain of the internal reference frequency to the domain according to the reference frequency includes resampling the frequency signals at one of the reference frequency and a fraction of the reference frequency.

24. The method of claim 20, wherein resampling the frequency signal includes using a Farrow filter configured to receive the samples of a frequency signal sampled at the internal reference frequency and apply a variable delay to allow for the samples of a frequency signal sampled at the internal reference frequency to be resampled according to the reference frequency.

25. The method of claim 20, wherein adjusting the modulator gain includes adjusting the modulator gain inversely proportionally to the change in the reference frequency.

26. The method of claim 25, wherein adjusting the modulator gain includes adjusting a current level applied to the modulator.

27. The method of claim 26, further comprising providing a programmable charge mirror configured to respond to the change in the reference frequency.

28. A method for adapting a modulating device to respond to a reference frequency having a variable frequency, comprising:

providing a gain adjustment to offset a change in a modulator gain responsive to a change in the reference frequency;

providing an internal reference signal source configured to provide an internal reference signal having an internal frequency that is independent of the reference frequency;

providing a frequency signal source configured to provide a plurality of first samples of the reference frequency signal wherein the first samples are taken at a first sampling frequency according to the internal reference signal;

adapting the plurality of first samples to compensate for a low-pass frequency response of an output system;

providing a resampling device configured to receive the internal reference signal, a divided frequency signal having a frequency proportional to frequency of the output system, and the plurality of adapted first samples and resample the plurality of first samples according to the reference frequency; and providing a sigma-delta modulator configured to receive a plurality of second samples and the divided frequency signal and adapt a frequency division ratio used by the output system.

29. The method of claim 28, wherein the first samples of the frequency signal are received one of: as a frequency component derived from a phase component generated by a polar modulation system; and as a frequency modulator output in a one-point frequency modulation system.

30. The method of claim 28, further comprising adjusting the resampled frequency signal to compensate for changes in a low-pass frequency response of the output system.

31. The method of claim 28, wherein resampling the frequency signal includes resampling the frequency signal at one of the reference frequency and a fraction of the reference frequency.

32. The method of claim 28, wherein resampling the frequency signal includes using a Farrow filter configured to receive the samples of a frequency signal sampled at the internal reference frequency and apply a variable delay to allow for the samples of a frequency signal sampled at the internal reference frequency to be resampled according to the reference frequency.

33. The method of claim 28, wherein providing the gain adjustment includes adjusting a current level of a tuning signal controlling the modulator frequency output.

34. The method of claim 33, wherein providing the gain adjustment includes employing a programmable charge mirror configured to respond to the reference frequency and generate an output that adapts the current level applied to the modulating device inversely proportionally to the change in the reference frequency.

* * * * *